Sept. 8, 1942. J. B. NEELY ET AL 2,295,422
REVETMENT MAT
Filed June 21, 1939 2 Sheets-Sheet 1

INVENTORS.
JOHN B. NEELY,
CHARLES P. GUTH,
BY Lawrence C. Kingsland
ATTORNEY.

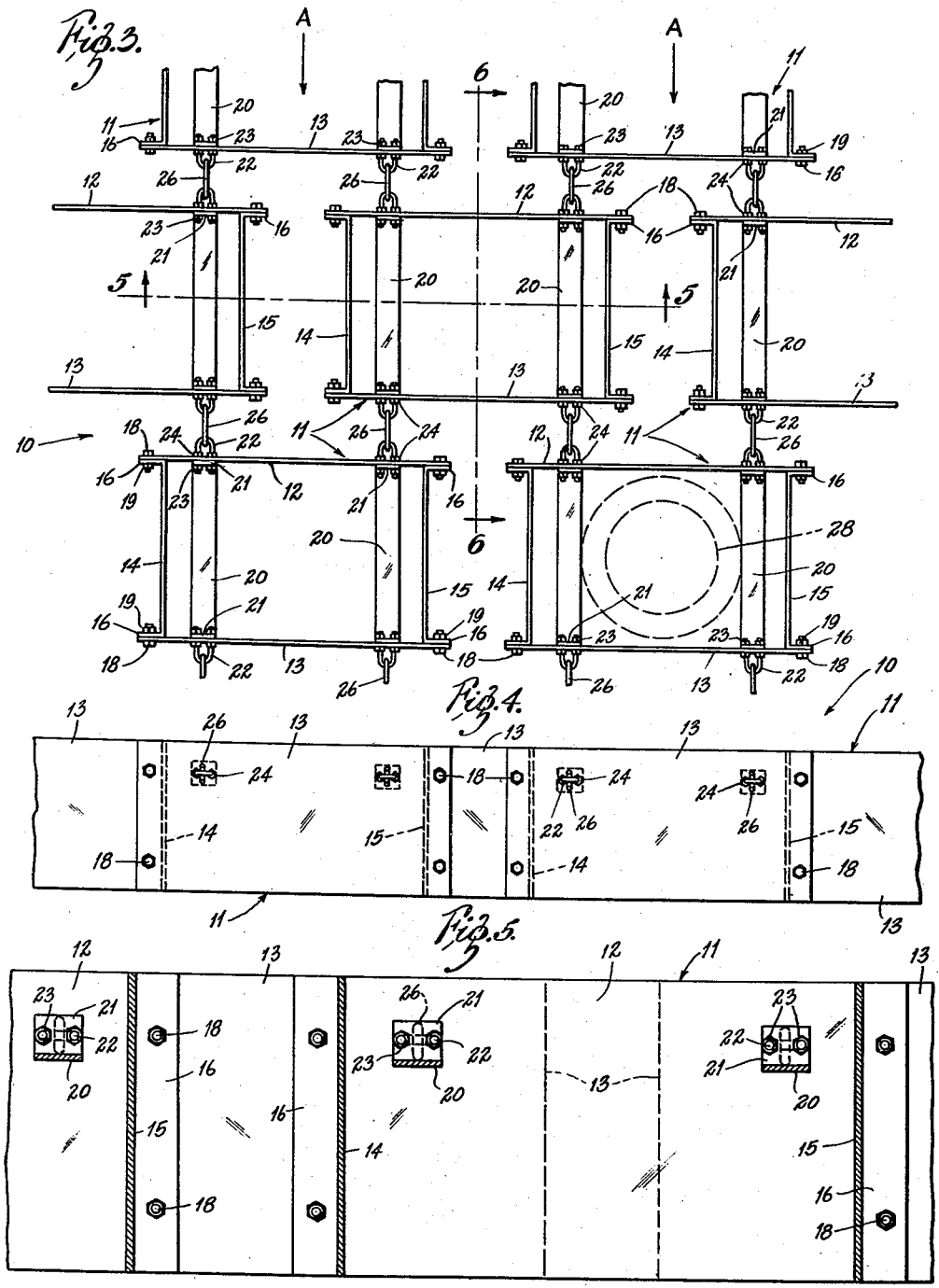

Patented Sept. 8, 1942

2,295,422

UNITED STATES PATENT OFFICE 2,295,422

REVETMENT MAT

John B. Neely and Charles P. Guth, St. Louis, Mo.

Application June 21, 1939, Serial No. 280,253

1 Claim. (Cl. 61—38)

The present invention relates generally to devices for protecting the retaining banks of flowing water, beaches, and the like, and more particularly to a novel revetment mat adapted to prevent the erosion of the retaining banks of flowing water, beaches, and the like.

An object of the present invention is to provide a novel revetment mat which is adapted to prevent the erosion of the retaining banks of flowing water, beaches, and the like.

Another object is to provide a novel revetment mat comprising a plurality of open, walled units connected in spaced relationship.

Another object is to provide a novel revetment mat which comprises a plurality of units interconnected in a manner to block washing by the moving water when the mat is in operative disposition.

Another object is to provide a novel revetment mat which is of metal fabrication, and which is adapted to protect from erosion the area over which it is disposed for an indefinite period of time.

Another object is to provide a novel revetment mat which is simple of manufacture, easy to transport and assemble, and which is readily adaptable to all of the purposes intended.

Other objects and advantages will be apparent from the following description, taken in conjunction with the accompanying drawings, in which:

Fig. 3 is a plan view of a segment of the revetment mat shown in Fig. 1;

Fig. 4 is a side view of the segment of revetment mat shown in Fig. 3;

Fig. 5 is a section on the line 5—5 of Fig. 3; and,

Figure 1:
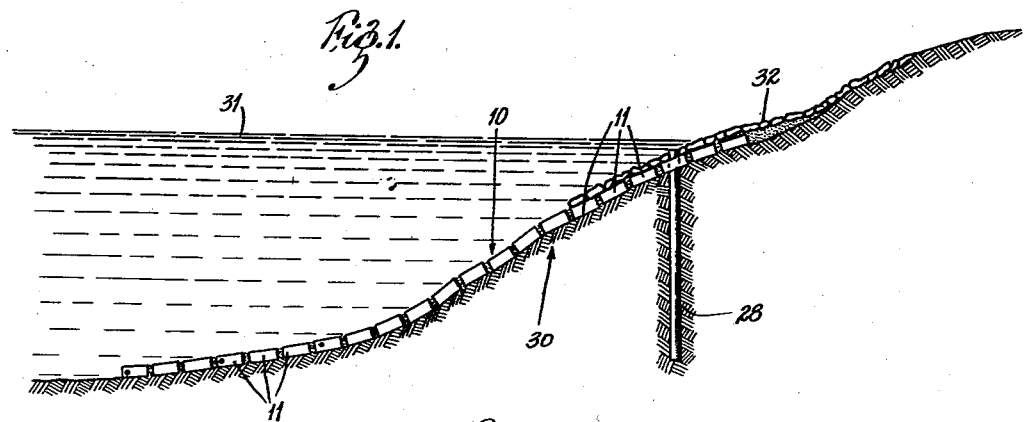
Fig. 1 is a cross section through a portion of river and river bank showing a preferred embodiment of the present invention in operative disposition along the bank.

Referring to the drawings more particularly by reference numerals, 10 designates generally a revetment mat constructed in accordance with the concepts of the present invention. The mat 10 (Fig. 3) comprises a plurality of units 11.

Each unit 11 includes opposed side walls 12 and 13, and opposed end walls 14 and 15, the walls 14 and 15 including flanges 16. Bolts 18 extend through suitable apertures in the ends of the side walls 12 and 13 and suitable apertures in the flanges 16 and receive nuts 19, thereby providing a rigid construction. A brace 20 is located adjacent each of the end walls 14 and 15. Each brace 20 terminates at its ends in apertured flanges 21 which are disposed against the interior of the side walls 12 and 13. A U-bolt 22 extends through each pair of apertures and receives nuts 23 on the free ends interiorly of the unit 11. Nuts 24 disposed on each U-bolt 22 provide suitable exterior stops therefor.

Links 26 connect alternate U-bolts 22 of spaced units 11. It is to be noted that the units 11 (Fig. 3) are staggered so that water moving in the direction of the arrows A cannot channel the bank.

Figure 2:
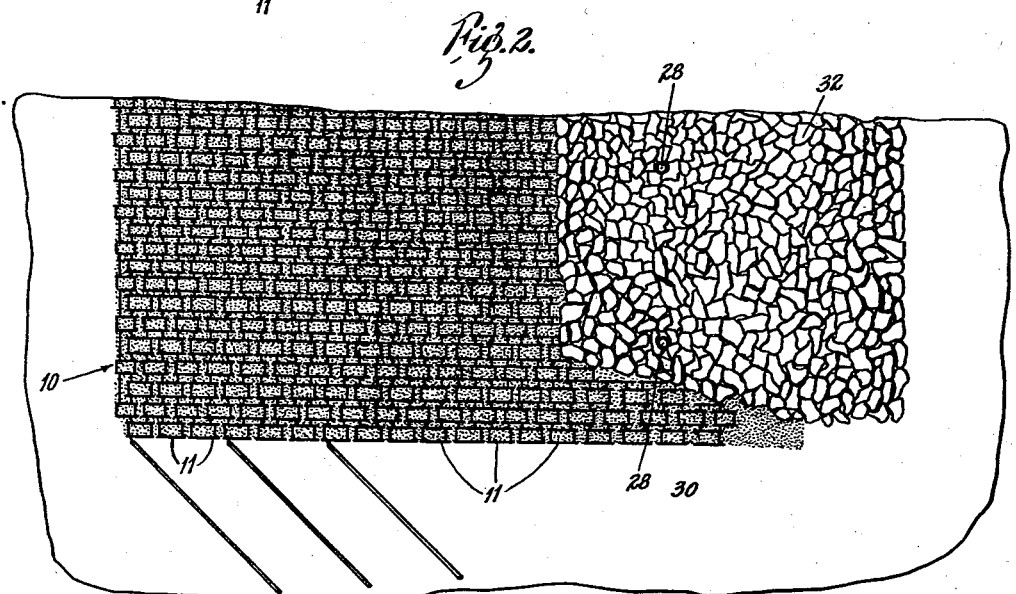
Fig. 2 is a plan view of the river, river bank, and revetment shown in Fig. 1, parts being broken away for clarity.
Figure 6:
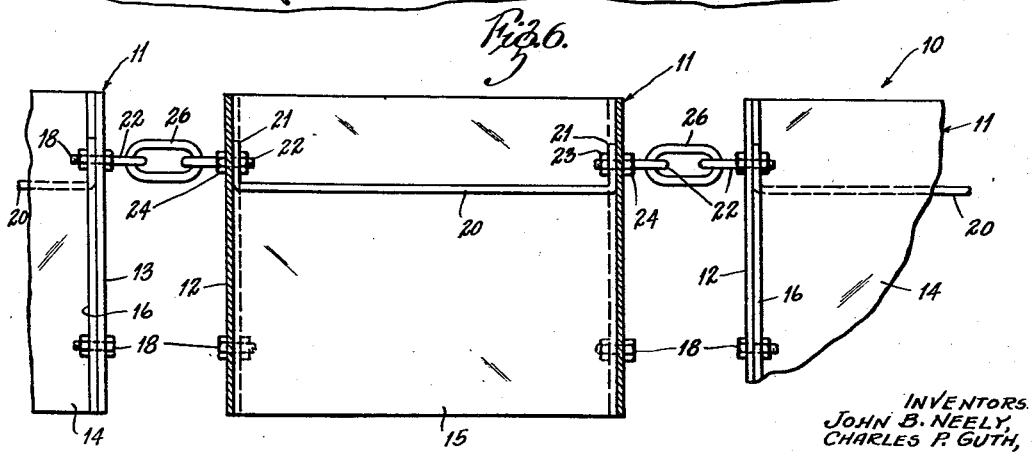
Fig. 6 is a section on the line 6—6 of Fig. 3.

The mat 10 is anchored in place on a river bank, or the like, by suitably spaced piles 28 (Figs. 1 and 2). The number and spacing of the piles will, of course, depend upon the circumstances of each installation. The size of each unit 11 and the number thereof for each mat are functions of the circumstances of a particular installation.

The units 11 are preferably of metal, and of some particular metal which is relatively cheap and long enduring when subjected to water. As shown, the walls of the units 11 are solid in construction, but, if desirable, the walls may be of a suitable skeleton construction. Each unit 11 may have a full or skeleton bottom, although the open construction is preferred.

In use, the mat 10 is disposed on a river bank 30 (Fig. 1) with the mat 10 extending well beneath the water 31. The upper edge of the mat 10 extends slightly above the normal water line of the stream or river. Crushed stone 32, or the like, is disposed over the upper portion of the mat 10.

The present mat 10 effectively eliminates erosion along the retaining bank of moving water. Since the units 11 are open at the bottom, they settle a little into the material forming the bank which is to be protected. Since there are no tops to the units 11, sediment of whatever kind carried by the moving water will be deposited in and about the units 11. Hence, the area covered by the mat 10 will gradually build up. Erosion will be completely stopped and, in fact, the moving water will build up the formerly eroded area.

It is apparent from the foregoing that a revetment mat has been provided which fulfills all of the objects and advantages sought therefor.

It is to be understood that the foregoing description and accompanying drawings have been given by way of illustration and example and not for purposes of limitation, the invention being limited only by the claim which follows.

What is claimed is:

A revetment comprising a plurality of metal units, each unit including side walls and end walls connected to form a hollow construction, each unit further including a brace adjacent each end wall connected to and between the side walls, and means flexibly interconnecting the units having direct connection with the braces, the connecting means being secured to alternate braces to stagger the units.

JOHN B. NEELY.
CHARLES P. GUTH.